US012435742B2

(12) United States Patent
Kaniche et al.

(10) Patent No.: US 12,435,742 B2
(45) Date of Patent: Oct. 7, 2025

(54) SYSTEMS AND METHODS FOR DETECTION AND ASSIGNMENT OF SELECTIVE CONTROL VALVE COUPLINGS

(71) Applicant: DEERE & COMPANY, Moline, IL (US)

(72) Inventors: Onkar Kaniche, Pune (IN); Mohan A. Vadnere, Pune (IN)

(73) Assignee: Deere & Company, Moline, IL (US)

( * ) Notice: Subject to any disclaimer, the term of this patent is extended or adjusted under 35 U.S.C. 154(b) by 287 days.

(21) Appl. No.: 18/470,983

(22) Filed: Sep. 20, 2023

(65) Prior Publication Data

US 2025/0092888 A1 Mar. 20, 2025

(51) Int. Cl.
*F15B 20/00* (2006.01)
*A01B 76/00* (2006.01)

(52) U.S. Cl.
CPC ............ *F15B 20/005* (2013.01); *A01B 76/00* (2013.01)

(58) Field of Classification Search
CPC ............................... F15B 20/005; A01B 76/00
See application file for complete search history.

(56) References Cited

U.S. PATENT DOCUMENTS

| 8,581,738 | B2 | 11/2013 | Maggiore | |
|---|---|---|---|---|
| 11,071,246 | B2* | 7/2021 | Turner | A01B 59/04 |
| 11,598,188 | B2* | 3/2023 | Yeung | E21B 43/2607 |
| 11,761,846 | B2* | 9/2023 | Yeung | G01M 3/26 60/734 |
| 11,867,118 | B2* | 1/2024 | Yeung | F02C 7/236 |
| 11,898,504 | B2* | 2/2024 | Yeung | F02C 6/00 |
| 12,077,030 | B2* | 9/2024 | Ogawa | B60K 11/02 |
| 12,313,092 | B2* | 5/2025 | Pintore | F15B 13/02 |

(Continued)

FOREIGN PATENT DOCUMENTS

| DE | 102011120884 A1 | 6/2013 |
|---|---|---|
| DE | 102017126477 A1 | 5/2019 |

(Continued)

OTHER PUBLICATIONS

Extended European Search Report and Written Opinion issued in European Patent Application No. 24200451.3 dated Feb. 3, 2025, in 05 pages.

*Primary Examiner* — Chico A Foxx
(74) *Attorney, Agent, or Firm* — Taft Stettinius & Hollister LLP; Stephen F. Rost

(57) ABSTRACT

A detection system that can identify fluid connections between a plurality of control valves of, including secured to, an agricultural vehicle and an implement of an agricultural machine. Information captured by a sensor(s) can provide information that identifies one or more identifiers, each identifier being coupled to a different conduit that is used in the exchange of hydraulic fluid between the agricultural vehicle and the implement. The identifier can also correspond to recorded information regarding the particular subsystem or operation of the implement to which the conduit associated with the identified identifier is fluidly coupled. Additionally, information captured by the sensor can be used to detect the particular control valve to which the conduit associated with the identified identifier is coupled. Such information can be used in the identification, or assignment, of the particular control valve that is fluidly coupled to a particular subsystem or operation of the implement.

20 Claims, 6 Drawing Sheets

(56) References Cited

U.S. PATENT DOCUMENTS

| | | |
|---|---|---|
| 2013/0038633 A1 | 2/2013 | Maggiore |
| 2014/0172247 A1* | 6/2014 | Thomson ............. A01B 63/112 |
| | | 701/50 |
| 2020/0045879 A1* | 2/2020 | Kowalchuk ............ A01C 7/004 |
| 2020/0187407 A1* | 6/2020 | Stovall ................. A01B 29/048 |
| 2020/0236840 A1* | 7/2020 | Turner .................. A01C 19/00 |
| 2023/0069727 A1* | 3/2023 | Comunale ................ B67D 1/07 |

FOREIGN PATENT DOCUMENTS

| | | | |
|---|---|---|---|
| DE | 102019208346 A1 | 12/2020 | |
| EP | 3915349 A1 | 12/2021 | |
| WO | WO-2016099257 A1 * | 6/2016 | .............. B60D 1/62 |
| WO | 2019101418 A1 | 5/2019 | |

\* cited by examiner

SYSTEMS AND METHODS FOR DETECTION AND ASSIGNMENT OF SELECTIVE CONTROL VALVE COUPLINGS

FIELD OF THE DISCLOSURE

The present disclosure generally relates to coupling of hydraulic circuits between an agricultural vehicle and an implement, and, more specifically, to automatic detection and assignment of selective control valves for each of a plurality of hydraulic circuits.

BACKGROUND

Agricultural machines, including, for example, tractors, can be utilized to push, pull, or tow various implements that are configured to perform an agricultural operation(s). For example, tractors can be utilized to at least provide a force that propels various implements that can perform an agricultural operation such as, for example, seeding a field, spraying crops, cutting crops, forming windrows, or performing bailing operations, among other agricultural operations.

The implements used to perform such agricultural operations can have various hydraulically operated subsystems used to perform, as well as control, various operations of the implement. With at least certain types of implements, the hydraulically operated subsystems of the implement can be fluidly coupled to a hydraulic system of the agricultural vehicle. With such agricultural machines, a pump and associated fluid reservoir, among other components, that are part of a hydraulic system of the agricultural vehicle can be fluidly coupled to different subsystems of the implement, thereby becoming part of fluid circuits of subsystems of the implement.

SUMMARY

The present disclosure may comprise one or more of the following features and combinations thereof.

In one embodiment of the present disclosure, a method is provide for identifying a fluid connection between a control valve secured to an agricultural vehicle and an implement of an agricultural machine. The method can include transmitting a signal containing captured information obtained by a sensor, and identifying, from the transmitted captured information, an identifier coupled to a conduit. Additionally, the method can include retrieving or receiving an identification of at least one of a subsystem or an operation of the implement assigned to the identifier, and detecting, from the captured information, the control valve to which the conduit is fluidly coupled. Further, an assignment can be recorded of the control valve detected from the captured information to at least one of the subsystem or the operation assigned to the identifier, and a signal can be transmitted for displaying, on a display unit, an identification of the assignment of the control valve identified from the captured information to at least one of the subsystem or the operation.

In another embodiment, a method is provided for identifying fluid connections between a plurality of control valves secured to an agricultural vehicle and a plurality of subsystems or operations of an implement. The method can include identifying, from information captured by one or more sensors, a plurality of identifiers, each identifier of the plurality of identifiers being coupled to a different conduit of a plurality of conduits, each conduit being coupled to a control valve of the plurality of control valves and at least one of a subsystem of a plurality of subsystems or an operation of a plurality of operations of the implement. Further, for each identifier of the plurality of identifiers, an identification can be retrieved or received of at least one of the subsystem or the operation assigned to the identifier. Additionally, at least some of the plurality of identifiers can be assigned to a different subsystem of the plurality of subsystems or a different operation of the plurality of operations than at least another identifier of the plurality of identifiers. The method can also include identifying, for each identifier, and from the captured information, the control valve of the plurality of control valves that is to be associated with at least one of the identifier or the conduit that is coupled to the identifier, and recording an assignment of the control valve identified from the captured information to at least one of the subsystem or the operation assigned to the identifier. Further, one or more signals can be transmitted for displaying on a display unit an identification, for each control valve, of the assignment of the control valve to at least one of the subsystem or the operation.

In a further embodiment of the present disclosure, a system is provided for identifying a fluid connection between a control valve secured to an agricultural vehicle and an implement. The system can include a plurality of identifiers, each identifier of the plurality of identifiers being coupled to a conduit of a plurality of conduits, each conduit of the plurality of conduits configured to be fluidly coupled between a control valve of a plurality of control valves at the agricultural vehicle and a subsystem of a plurality of subsystems of the implement. The system can further include at least one sensor positioned to capture information, a display unit, at least one processor, and a memory device coupled with the at least one processor. The memory device can include instructions that when executed by the at least one processor can cause the at least one processor to identify, from information captured by the at least one sensor, at least one identifier of the plurality of identifiers, and retrieve or receive, for the at least one identifier, an identification of at least one of the subsystem or an operation of the subsystem assigned to the at least one identifier. Additionally, the memory device can include instructions that when executed by the at least one processor can cause the at least one processor to identify, for each of the at least one identifier, and from the captured information, the control valve of the plurality of control valves that is to be associated with the at least one identifier or the conduit that is coupled to the at least one identifier, and determine an assignment of the control valve identified from the captured information to the at least one of the subsystem or the operation of the subsystem assigned to the at least one identifier. The memory device can also include instructions that when executed by the at least one processor can cause the at least one processor to generate one or more signals to display on the display unit an identification of the assignment of the control valve to at least one of the subsystem or the operation of the subsystem.

These and other features of the present disclosure will become more apparent from the following description of the illustrative embodiments.

BRIEF DESCRIPTION OF THE DRAWINGS

The disclosure contained herein is illustrated by way of example and not by way of limitation in the accompanying Figures. For simplicity and clarity of illustration, elements illustrated in the Figures are not necessarily drawn to scale. For example, the dimensions of some elements may be exaggerated relative to other elements for clarity. Further, where considered appropriate, reference labels have been repeated among the Figures to indicate corresponding or analogous elements.

Corresponding reference numerals are used to indicate corresponding parts throughout the several views.

DETAILED DESCRIPTION

Figure 1:
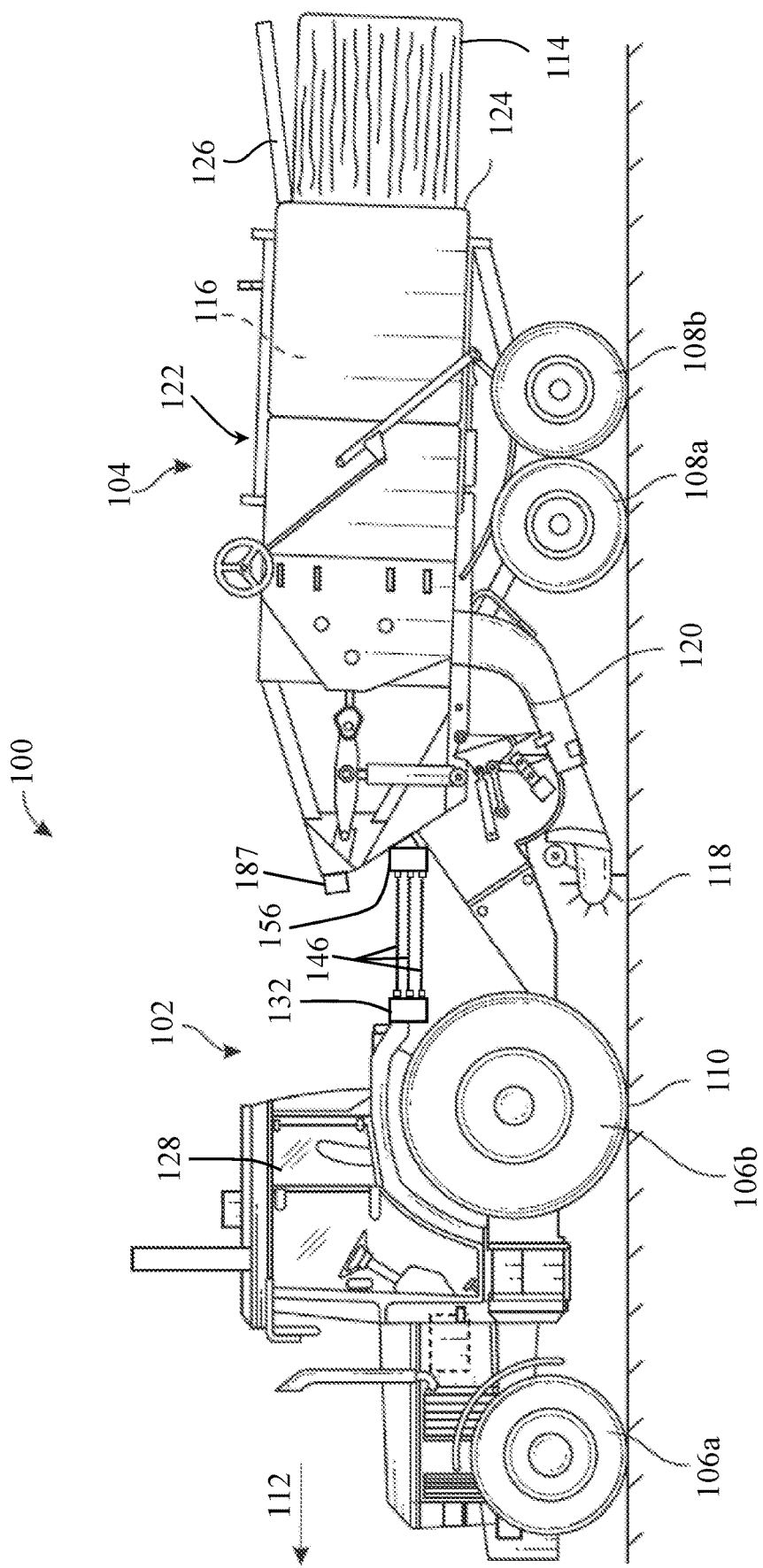
FIG. 1 illustrates a side perspective view of an exemplary agricultural machine having an agricultural vehicle in the form of a tractor and an agricultural implement in the form of a baler.
Figure 2:
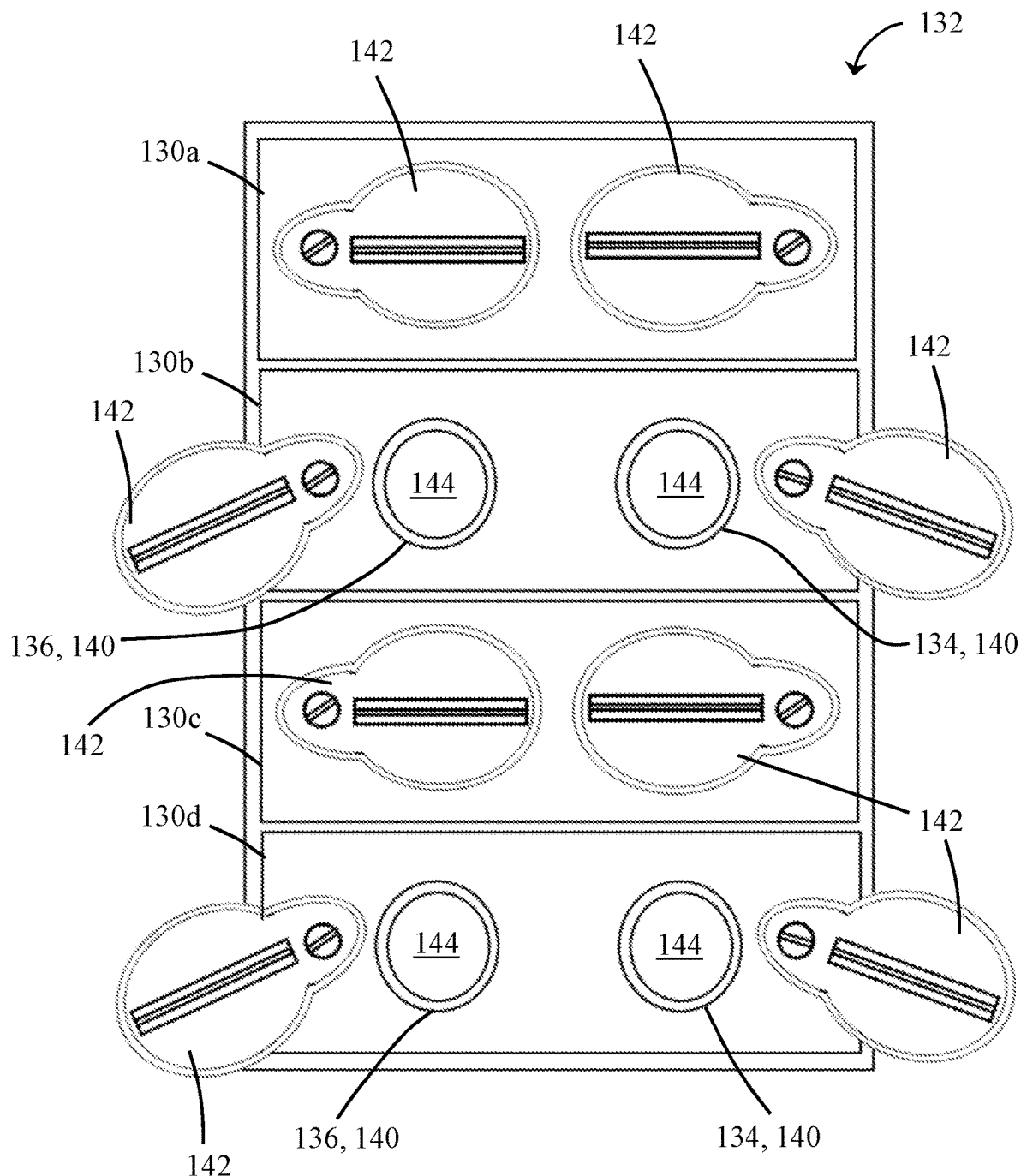
FIG. 2 illustrates a front side view of an exemplary selective control valve connector manifold having a plurality of individual electrohydraulic selective control valves (SCVs) either in a covered condition or an uncovered condition.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative Figures. Additionally, the inclusion of a structural or method feature in a particular Figure is not meant to imply that such feature is required in all embodiments and, in some embodiments, may not be included or may be combined with other features.

A number of features described below may be illustrated in the drawings in phantom. Depiction of certain features in phantom is intended to convey that those features may be hidden or present in one or more embodiments, while not necessarily present in other embodiments. Additionally, in the one or more embodiments in which those features may be present, illustration of the features in phantom is intended to convey that the features may have location(s) and/or position(s) different from the locations(s) and/or position(s) shown.

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Referring now to FIG. 1, an exemplary agricultural machine 100 is depicted that includes an agricultural vehicle 102, such as, for example, a tractor, that is coupled to an implement 104. Moreover, in the illustrated embodiment, the implement 104 is embodied as, or otherwise includes, a baler, such as, for example, a square or round baler, among other types of balers. However, a variety of different agricultural machines or implements can be utilized as the agricultural machine 100, including, but not limited to, seeders, forage harvesters, and sprayers, among others. Additionally, while FIG. 1 illustrates the agricultural machine 100 as including an implement 104 that is towed by the agricultural vehicle 102, according to certain embodiments, the implement 104 can comprise an agricultural device, equipment, or tool that can be pushed or pulled by the agricultural vehicle 102. Further, the implement 104 can be coupled to the agricultural vehicle 102 in a variety of different manners, including, but not limited to, via a hitch, among other couplings.

The agricultural vehicle 102 can include one or more ground engagement bodies 106a, 106b, such as, for example, wheels, tires, or tracks, as well as various combinations thereof, among other types of ground engagement bodies. Similarly, according to at least certain embodiments, the implement 104 can also include can also include one or more ground engagement bodies 108a, 108b, such as, for example, wheels, tires, or tracks, as well as various combinations thereof, among other types of ground engagement bodies. While FIG. 1 illustrates such engagement bodies 106a, 106b, 108a, 108b on one side of the agricultural vehicle 102 and the implement 104, respectively, similar engagement bodies 106a, 106b, 108a, 108b can additionally be located on the opposing side of the corresponding agricultural vehicle 102 and implement 104, among other locations. The ground engagement bodies 106a, 106b, 108a, 108b are positioned to contact the adjacent ground surface 110, and are used in connection with propulsion of the agricultural machine 100 in at least the forward operating or travelling direction 112 along the ground surface 110. Additionally, an angular orientation of at least some of the ground engagement bodies 106a, 106b, 108a, 108b relative to the ground surface 112 can be adjusted in connection with steering or guiding the direction of travel of the agricultural machine 100.

According to the illustrated embodiments, the exemplary agricultural machine 100 is to perform an agricultural operation subsequent to another agricultural operation that may have been perform by utilizing a different agricultural implement or agricultural machine. For instance, in the illustrated example, a prior agricultural operation may have been performed relating to cutting a crop plant so as to form a windrow. In such an example, the illustrated agricultural machine 100 shown in FIG. 1 can utilize an implement 104 in the form of a baler to either or both collect or bale at least a portion of the cut crop material that was contained in a windrow. However, various other types of agricultural operation(s) can be performed by agricultural machine 100. For example, according to certain embodiments, the implement 104 coupled to the agricultural vehicle 102 can be a sprayer, or, alternatively, can be utilized for planting crop seeds, among other agricultural operations. Further, such different agricultural operations may involve changing the implement 104 that is coupled to the agricultural vehicle 102, or, alternatively, involve one or more other agricultural implements 104 that is/are coupled to one or more other agricultural vehicles 102.

In the illustrated example in which the implement 104 is a baler, the agricultural machine 100 is capable of traversing the field, collecting crop material from the windrow from the ground surface 110 of the associated field, and processing the collected crop material to form crop bales 114. Accordingly, in the exemplary embodiment, the implement 104 of the agricultural machine 100 can include one or more mechanisms that cooperate to collect and deliver crop material from the windrow into a baling or compression chamber 116 of the implement 104. For example, the implement 104 of the agricultural machine 100 can include a pick-up mechanism 118 that is configured to gather crop material from the windrow and feed it, via a loading mechanism 120, toward the compression chamber 116 of a compression system 122. The pick-up mechanism 118 can include devices such as tines, forks, augers, conveyors, baffles, cutters, pre-cutter assemblies, the like, or any combination thereof. The loading mechanism 120 can include devices such as projections, tines, forks, knives, the like, or any combination thereof.

The baling or compression system 122 can include at least one baler or compression mechanism or chamber that is capable of compressing and/or shaping the collected crop material from the windrow into one or more crop bales 114. The compression system 122 can be powered by a drive unit such as, for example, a motor or engine. For example, rotational power from a power source such as, for example, a drive unit of the agricultural machine 100, can be provided or transmitted to the compression system 122 via use of a power-takeoff (PTO) shaft that is coupled to the power source. The PTO shaft can be directly or indirectly coupled to the compression system 122. Crop bales 114 formed by the agricultural machine 100 can be ejected from a rear opening 124 of the compression chamber 116 tailgate or rear door or gate 126 of the implement 104. Thus, the gate 126 can be, for example, in a closed, or lowered position so as to be generally adjacent to the compression chamber 116 at least while collected crop material is being compressed by the compression system 122 within the compression chamber 116. The gate 126 can also be displaced to a raised, or open position, as shown in FIG. 1, so that a compressed bale 114 can be released from the baler 104.

The agricultural vehicle 102 can include a hydraulic system that can be utilized to operate various subsystems of the agricultural vehicle 102, including, for example, either or both steering and braking systems of the agricultural vehicle 102, among subsystems, devices or components.

The hydraulic system can include, for example, a pump 182 (FIG. 3) and one or more fluid reservoirs, among other components. The pump 182 can be utilized to at least assist in circulating hydraulic fluid about the hydraulic system of at least the agricultural vehicle 102, and can also be configured to at least assist in pressurizing the hydraulic fluid within the hydraulic system.

The hydraulic system of the agricultural vehicle 102 can include a plurality of electrohydraulic selective control valves (SCVs) 130a-d, as illustrated, for example, in at least FIGS. 2-5. While the SCVs 130a-d can be positioned at a variety of locations about the agricultural vehicle 102, according to the illustrated embodiment, a plurality of individual SVCs 130a-d can be position together, including, for example, and in a stack arrangement, to provide a selective control valve connector manifold 132, as seen, for example, in FIGS. 1 and 2. While FIGS. 2-5 illustrate a selective control valve connector manifold 132 having four SCVs 130a-d, the number of SCVs 130a-d can vary, and, according to certain embodiments, the number of SCVs 130a-d can also be adjustable.

As seen in FIGS. 2-5, according to certain embodiments, for each SCV 130a-d, the SCV 130a-d can include a fluid outlet 134 through which hydraulic fluid flows out from the associated SCV 130a-d, and thus out of the hydraulic system of the agricultural vehicle 102. For example, such hydraulic fluid can flow, for example, via operation of the pump 182, through an opened SCV 130a-d in connection with being supplied for an associated portion of the fluid circuit 138a-d located at the implement 104. Each SCV 130a-d can also include a fluid inlet 136 for the return of hydraulic fluid from the portion of the fluid circuit 138a-d located at the implement 104 to the hydraulic system of the agricultural vehicle 102. Further, each fluid outlet 134 and fluid inlet 136 can include a coupling 140, such as, for example, a threaded or quick disconnect style coupling, among others, that is configured for coupling to a conduit 146a-d (collectively referred to as conduit 146) that is used in the delivery of hydraulic fluid to, or from, the implement 104. Additionally, according to certain embodiments, each coupling 140 can be selectively covered by a cover 142. The cover 142 can be configured and positioned to selectively extend over an opening 144 of the adjacent coupling 140 so as to at least assist in preventing debris from entering into the SCV 130a-d, and thus into the hydraulic system of the agricultural vehicle 102. Thus, for example, referencing FIG. 2, when a particular SCV 130a, 130c is not in use, a cover 142 can be positioned over the corresponding openings 144 of the couplings 140. In such an example, when a particular SCV 130b, 130d is to be utilized, the covers 142 over the openings 144 of the adjacent couplings 140 for those particular SCVs 130b, 130d can be displaced, such as, for example, rotated, away from the coupling 140 so as to not interfere with an attachment of a conduit 146 to that coupling 140.

Figure 3:
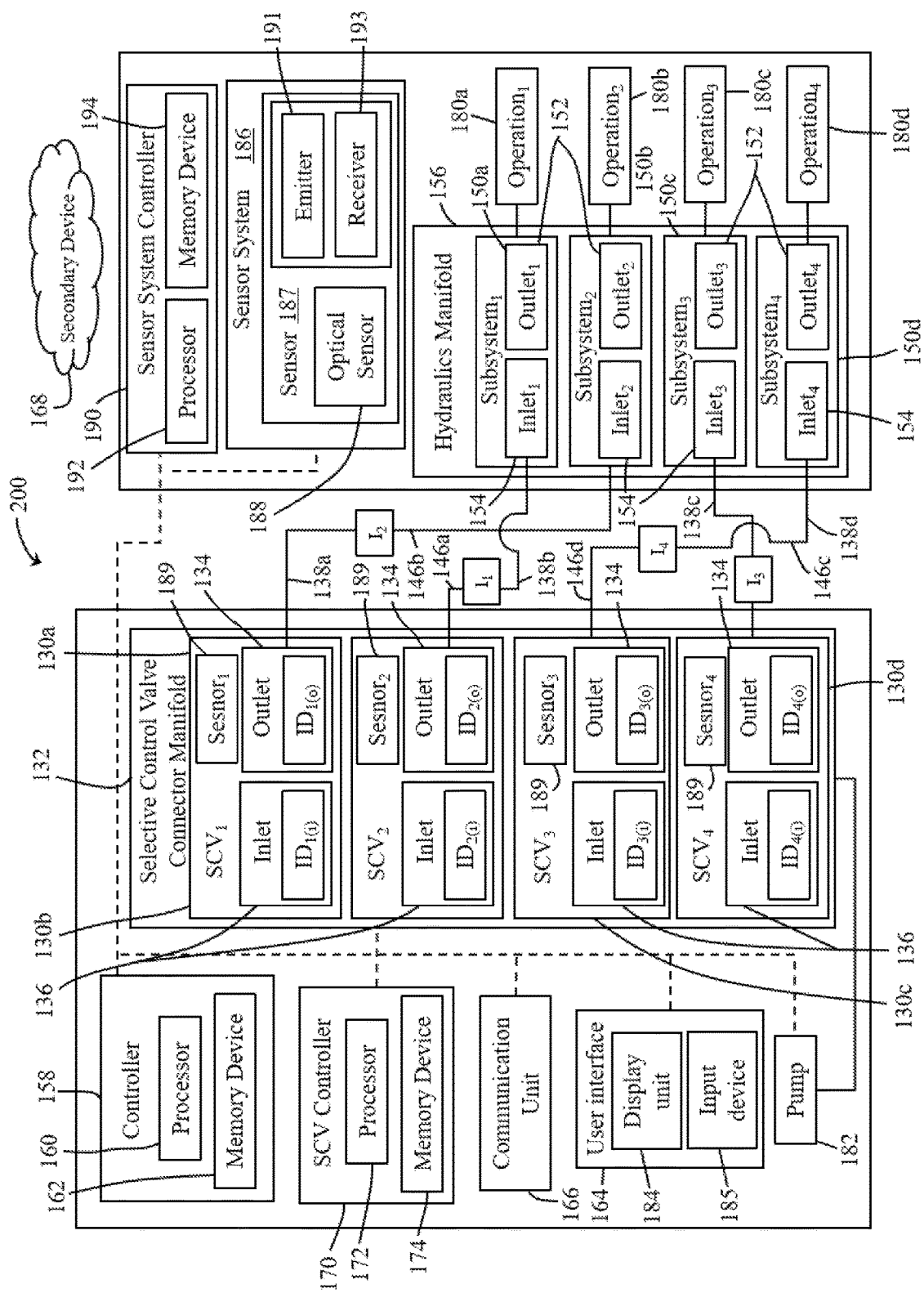
FIG. 3 illustrates a simplified block diagram of an exemplary electrohydraulic selective control valve (SCV) detection system.

FIG. 3 illustrates a simplified block diagram of an exemplary electrohydraulic selective control valve (SCV) detection system 200. As illustrated by at least FIG. 3, each SCV 130a-d can individually be fluidly coupled to, via one or more conduits 146, a subsystem 150a-d of the implement 104, and thus be fluidly coupled to a corresponding portion of a fluid circuit 138a-d associated with than particular subsystem 150. Accordingly, when an SCV 130a-d is fluidly coupled to an agricultural implement 104, a corresponding fluid circuit 138a-d can be completed that fluidly couples the hydraulic system of the agricultural vehicle 102 to a portion of the fluid circuit 138a-d provided by, and used to at least partially operate, the corresponding subsystem 150a-d of the implement 104. For example, hydraulic fluid can pass from the fluid outlet 134 of an SCV 130a-d at the agricultural vehicle 102, and thus from the hydraulic system of the agricultural vehicle 102, through a conduit 146, and enter a fluid inlet 154 of an associated subsystem 150a-d of the implement 104. Similarly, each fluid circuit 138a-d can be configured such that the hydraulic fluid can pass from the implement 104 through a fluid outlet 152 of the subsystem 150a-d, through another, or return, conduit 146, and through a fluid inlet 136 of the associated SCV 130a-d so as to return to the hydraulic system of the agricultural vehicle 102. While FIG. 3 illustrates the fluid inlets 154 and fluid outlets 152 of the implement 104 being arranged together in connection with a hydraulics manifold 156, at least some, if not all, of the fluid inlets 136 and fluid outlets 138 of the subsystems 150 of the implement 104 may, or may not, be generally positioned at, or around, the location of the fluid inlets 154 and fluid outlets 152 of other subsystems 150a-d.

For at least purposes of illustration, FIG. 3 illustrates a single conduit connection between the SCVs 130a-d and the associated subsystems 150a-d. However, as previously discussed, each of the illustrated conduits 146 can comprise a first conduit that can accommodate a flow of hydraulic fluid from the SCV 130a-d to the associated subsystem 150, and another conduit for the return of hydraulic fluid from the subsystem 150a-d to the corresponding SCV 130a-d.

The agricultural vehicle 102 can, over time, be coupled to different implements 104 that may have different numbers of subsystems 150a-d. Thus the conduits 146a-d to which the agricultural vehicle 102 are coupled can change for different implements 104. In such situations, the conduits 146 to which the agricultural vehicle 102 is coupled can change. With such disconnection and reconnection of the SCVs 130a-d to the various subsystems 150a-d of different implements 104, the particular subsystem 150a-d to which an SCV 130a-d can change. Thus, while FIG. 3 and the below discussion utilizes terms like "first" and "second", among other terms, with respect to identifying a particular SCV 130a-d or subsystem 150a-d, the "first" SCV 130a does not necessarily need to be coupled to the "first" subsystem 150a. Similarly, the "second", "third", and "fourth" SCVs 130b-d do not necessarily need to be coupled to a "second", "third", and "fourth" subsystem 150b-c, respectively, let alone be coupled to any subsystem 150a-d. Thus, for instance, the example shown in FIG. 3 illustrates the first SCV 130a being fluidly coupled to the second subsystem 150b, the second SCV 130b being fluidly coupled to the first subsystem 150a, the third SCV 130c being fluidly coupled to the fourth subsystem 150d, and the fourth SCV 130d being fluidly coupled to the third subsystem 150c. As discussed below, embodiments of the subject disclosure can ease the burden, and minimize errors, with respect to the detection and assignment of which particular SCV 130a-d is fluidly coupled to which particular subsystem 150a-d o the implement 104, if any.

As seen in FIG. 3, the SCV detection system 200 can include a controller 158 of the agricultural vehicle 102 that can include, or can be associated with, one or more processors 160 that can follow instructions, including control instructions, contained with, or are part of, one or more memory devices 162, including, for example, a non-transitory machine-readable medium. Various operations, steps or algorithms as described in connection with the work vehicle controller 158 can be embodied directly in hardware, in a computer program product such as a software module executed by the processor 160, or in a combination of the two. The computer program product can reside in RAM memory, flash memory, ROM memory, EPROM memory, EEPROM memory, registers, hard disk, a removable disk, as well as combinations thereof, among any other form of computer-readable medium. Further, the controller 158 can be a single controller having all of the described functionality, or it can include multiple controllers wherein the described functionality is distributed among the multiple controllers.

Figure 7:
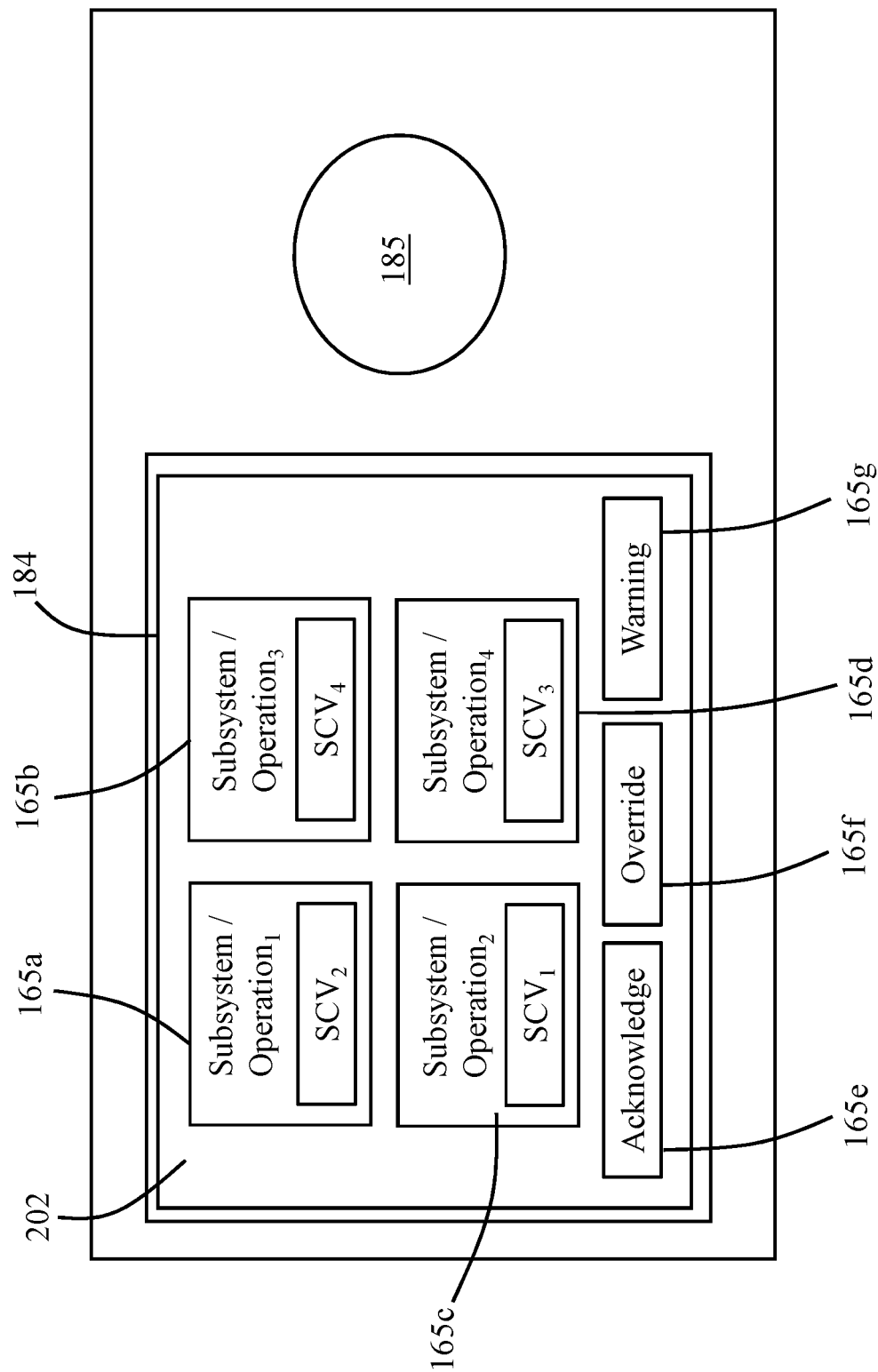
FIG. 7 illustrates an exemplary control panel displaying on a graphical user interface shown on a display unit at least information populated by the exemplary SCV detection system identifying assignments of SCVs to particular subsystems or operations of the implement.

The controller 158 can be coupled to one or more user interfaces 164 of the agricultural vehicle 102 that can be utilized by the human operator to input instructions that can be received by at least the controller 158. The user interface 164 can take a variety of forms, including, for example, be or include a monitor, screen, touch screen, keyboard, keypad, mouse, switch, joystick, button, or steering wheel, as well as any combination thereof, among other types of controls or user inputs for operating the agricultural vehicle 102, including operation of the engine, hydraulic cylinders, and the like. For example, for at least purposes of illustration, FIGS. 3 and 7 illustrate the user interface 164 as comprising a display unit 184 or other outputs from the system such as indicator lights, audible alerts, and the like, and an input device 185, such as for example, a joystick, among other input devices.

According to certain embodiments, the user interface 164 can be positioned in an operator cab 128 (FIG. 1) of the agricultural vehicle 102. Such an onboard user interface 164 can be coupled to the controller 158 via, for example, a controller area network (CAN) bus arrangement or other equivalent forms of electrical and/or electro-mechanical signal transmission. Another form of the user interface 164 can take the form of a display unit that is generated on a remote (i.e., not onboard) computing device, which can display outputs, such as, for example, status indications and/or otherwise enable user interaction such as the providing of inputs to, or for, the agricultural vehicle 102. In the context of a remote user interface 164, data transmission between, for example, the controller 158 and the user interface 164 can utilize a communication unit 166 of the agricultural vehicle 102, and can take the form of a wired and/or wireless communications system(s) and associated components and protocol(s).

The communication unit 166 can support or provide communications between the controller 158 of the agricultural vehicle 102 and external systems or devices, and/or support or provide communication interface with respect to internal components of the agricultural vehicle 102. The communications unit 166 can include wireless communication system components (e.g., via cellular, Wi-Fi, Bluetooth or the like) and/or can include one or more wired communications terminals, such as universal serial bus ports, among others. According to certain embodiments, the communication unit 166 can be communicatively coupled to a network, including, for example, via internet, cellular, and/or Wi-Fi networks. Such connection to the network can facilitate an exchange of information, including information between the agricultural machine 100 and a secondary device 168, including a central database, a remote database, such as, for example, a cloud based server or database, or other agricultural or work machines, as well as combinations thereof.

The SCV detection system 200 can also include one or more, if not a plurality, of SCVs 130a-d. Each SCV 130a-d can be utilized to selectively control the flow of hydraulic fluid within the associated fluid circuit 138a-d, and thereby at least assist in controlling the operation (generally identified in FIG. 3 as Operations$_{1-4}$) of each associated subsystem (generally identified in FIG. 3 as Susbsytems$_{1-4}$). Such control of hydraulic fluid flow can be utilized to control operation of one or more actuators of the fluid circuit 138a-d or associated subsystem 150a-d, including, for example, hydraulically actuated cylinders, among other hydraulic actuators. In the example shown in FIGS. 2-5, the selective control valve connector manifold 132 is illustrated as having four SCVs 130a-d, with each SCV 130a-d being individually fluidly coupled to the fluid inlets 136 and fluid outlets 134 of four subsystems 150a-d of the implement 104, and thus being part of a different fluid circuit 138a-d. Moreover, in FIG. 3, a first SCV 130a is fluidly coupled to a second subsystem 150b of the implement 104, a second SCV 130b is fluidly coupled to a first subsystem 150a of the implement 104, a third SCV 130c is fluidly coupled to a fourth subsystem 150d of the implement 104, and a fourth SCV 130d is fluidly coupled to third subsystem 150c of the implement 104. However, the particular subsystem 150a-d to which each SCV 130a-d is fluidly coupled can vary, and in some instances, can be based on the order in which an operator attaches the various associated conduits 146 that may already be attached to a subsystem 130a-d of the implement 104. Additionally, while FIG. 3 illustrates each SCV 130a-d being coupled to a subsystem 150a-d if the implement 104, in certain instances only a portion of the SCVs 130a-d maybe utilized. For instance, in certain situations, the implement 104 may have a number of subsystems 150a-d for such fluid connections that are less than the number of SCVs 130a-d that are available at the agricultural vehicle 102.

The operation of the each SCV 130a-d can be controller using the controller 158 of the agricultural vehicle 102. Additionally, or alternatively, according to certain embodiments, operation of the SCVs 130a-d can be at least partially controlled by an SCV controller 170 that has one or more processors 172 and memory devices 174 that can be similar to the above-discussed processor(s) 160 and memory device(s) 162 of the controller 158. One or both of the controller 158 and the SCV controller 170 can be used to control certain operations or settings of the SCVs 130a-d, including, for example, flow rates, among other functions. Moreover, one or both of the controller 158 and the SCV controller 170 can be utilized in at least connection with the operation of each SCV 130a-d, including with respect to the opening or closing of the SCVs 130a-d so as to control whether hydraulic fluid flows, or does not flow, from the hydraulic system of the agricultural vehicle 102 and to/from an associated subsystem 150a-d of the implement 104, as discussed below. For example, according to certain types of SCVs 130a-d, either or both the controller 158 and the SCV controller 170 can generate a signal that is received by a solenoid of an SCV 130a-d that can be used to individually control whether the associated SCV 130a-d is to be displaced to, or maintained, in an open position that can accommodate flow of hydraulic fluid through the SCV 130a-d, or be in a closed position that, at least temporarily, prevents the passage of hydraulic fluid through the SCV 130a-d.

With respect to the implement 104, the SCV detection system 200 can include a sensor system controller 190 having at least one processor 192 and a memory device(s) 194 that can have configurations that are similar to those discussed above with respect to at least the processor(s) 160 and memory device(s) 162, respectively, of the controller 158 of the agricultural vehicle 102. Additionally, while the sensor system controller 190 is illustrated in FIG. 3 as being located at the implement 104, according to other embodiments, the sensor system controller 190 can be located at the agricultural vehicle 102, or be located at a combination thereof. The sensor system controller 190 can be communicatively coupled to either or both the controller 158 of the agricultural vehicle 102 and the SCV controller 170 in a variety of different manners, including, but not limited to, a wired or wireless connection, as well as combinations thereof. For example, communications between the sensor system controller 190, or other portions of the implement 104, and either or both the controller 158 and the SCV controller 170 can utilize a CAN bus arrangement, among other forms of connections or communication protocols. Additionally, while FIG. 3 illustrates a separate sensor system controller 190, the sensor system controller 190 can be part of any other controller 158, 170 of the agricultural vehicle 102 or implement 104.

The SCV detection system 200 further includes a sensor system 186 that is configured to capture, or otherwise obtain, information that can be used to identify the SCV 130a-d to which each subsystem 150a-d of the implement 104 is fluidly coupled, as discussed below. For example, FIG. 3 illustrates an example in which a plurality of subsystems 150a-d that perform different operations (e.g. Operations$_{1-4}$) are fluidly coupled to a plurality of the SCVs 130a-d by various different conduits 146. For at least purposes of illustration, FIG. 3 depicts a single conduit 164 connection between the SCVs 130a-d and the associated subsystem 150a-d. However, as previously discussed, each of the conduits 146 illustrated in FIG. 3 can comprise a first conduit 146a that can accommodate a flow of hydraulic fluid from the SCV 130a-d to the associated subsystem 150, and another conduit for the return of hydraulic fluid from the subsystem 150a-d to the corresponding SCV 130a-d. Further, as previously mentioned, the agricultural vehicle 102 can, at different times, be couple to different implements 104 that may have different numbers of subsystems 150a-d. Thus the particular conduits 146a-d to which the agricultural vehicle 102 and SCVs 130a-d are coupled can change for different implements 104.

The sensor system 186 can include one or more sensors 187 that can be utilized in the detection or identification of the particular SCV 130a-d a particular conduit 164v is coupled, and thus at least assist in the assignment of an identified SCV 130a-d to a particular subsystem 150a-d or associated operation associated with that conduit(s) 146. According to certain embodiments, the sensor 187 can comprise one or more optical sensors 188, including, but not limited to, stereo depth cameras, stereo sensors, RGBD (red, green, blue, depth) cameras, three-dimensional sensors, three-dimensional cameras, structural light sensors, or light detection ranging sensors, as well as combinations thereof, among other types of sensors. For example, according to certain embodiments, the optical sensor 188 can capture information in one or more images or videos of an identifier ($I_1$, $I_2$, $I_3$, $I_4$) of at least some, if not all, of the conduits 146a-d. The identifiers ($I_1$, $I_2$, $I_3$, $I_4$) can be in a variety of formats, including, for example, text, numeric, symbols or colors, among other visual identifiers, as well as combinations thereof. Additionally, the memory device 194 of the sensor system controller 190, or other memory or database, can have a record or other recording that indicates which particular subsystem of the implement is associated with each identifier ($I_1$, $I_2$, $I_3$, $I_4$).

According to certain embodiments, the identifiers ($I_1$, $I_2$, $I_3$, $I_4$) can be attached or otherwise coupled to a conduit 146 at a location at which, when the conduit 146 is coupled to an SCV 130*a-d* of the SCV connector manifold 132, at least a portion of the identifier ($I_1$, $I_2$, $I_3$, $I_4$) can be detected by the sensor system 186. For example, according to certain embodiments, the identifier can be, or be on, a tag or collar 196 that is coupled to the conduit 146 at, around, or by, a connector body 198 of the conduit 146. In such an embodiment, the connector body 198 can be configured to be matingly secured to the couplings 140 of the SCVs 130*a-d*. Moreover, in one example, each identifier ($I_1$, $I_2$, $I_3$, $I_4$) is a different color on a collar 196 of each of the conduits 146*a-d*. In such an embodiment, the optical sensor 188 can be coupled to the implement 104 at a location at which the optical sensor 188 can capture information, such as, for example, in the form of one or more images or videos, that includes information the can indicate, or be used to derive, the color of one or more, if not all, of identifiers ($I_1$, $I_2$, $I_3$, $I_4$). According to such an embodiment, the sensor system controller 190, including the associated processor(s) 192, can be configured to evaluate such captured information from the optical sensor 188 on a pixel level, or based on a collection or area(s) of pixels, among other bases for evaluation. Such an evaluation can be based, for example, at least in part, on either or both a color or level of light present or not present in an area(s) or pixels in the captured information.

In addition to identifying an identifier ($I_1$, $I_2$, $I_3$, $I_4$) on a conduit 146, the sensor system controller 190 can also be configured to identify, or detect, objects, in from the captured information provided by the sensor(s) 187. Such object detection by the sensor system controller 190 can be utilized to identify the specific SCV 130*a-d* to which a conduit 146*a-d* having the identified identifier ($I_1$, $I_2$, $I_3$, $I_4$) is coupled. The object detection can be performed in a variety of different manners, including, for example, by recognizing the order in which the SCVs 130*a-d* are positioned relative to each other. For example, with respect to the exemplary SCV connector manifold 132 illustrated in at least FIGS. 2-5, such object detection can be utilized to detect, based on the order of the stacked arrangement of the SCVs 130*a-d*, among other features, the particular SCV 130*a-d* to which the conduit 146*a-d* having the identified identifier ($I_1$, $I_2$, $I_3$, $I_4$) is attached. Additionally, or alternatively, the captured information from the optical sensor 188 can include depth information, or other distance related information, that can be utilized by the sensor system controller 190 to identify which particular SCV 130*a-d* the conduit 146 having the identified identifier ($I_1$, $I_2$, $I_3$, $I_4$) is coupled. According to certain such embodiment, the memory device 194 of the sensor system controller 190, or other memory or database, can include information relating to the distances between the different SCVs 130*a-d* and the sensor 187 that can be utilized in determining the particular SCV 130*a-d* the conduit 146*a-d* having the identified identifier ($I_1$, $I_2$, $I_3$, $I_4$) is coupled.

Figure 4:
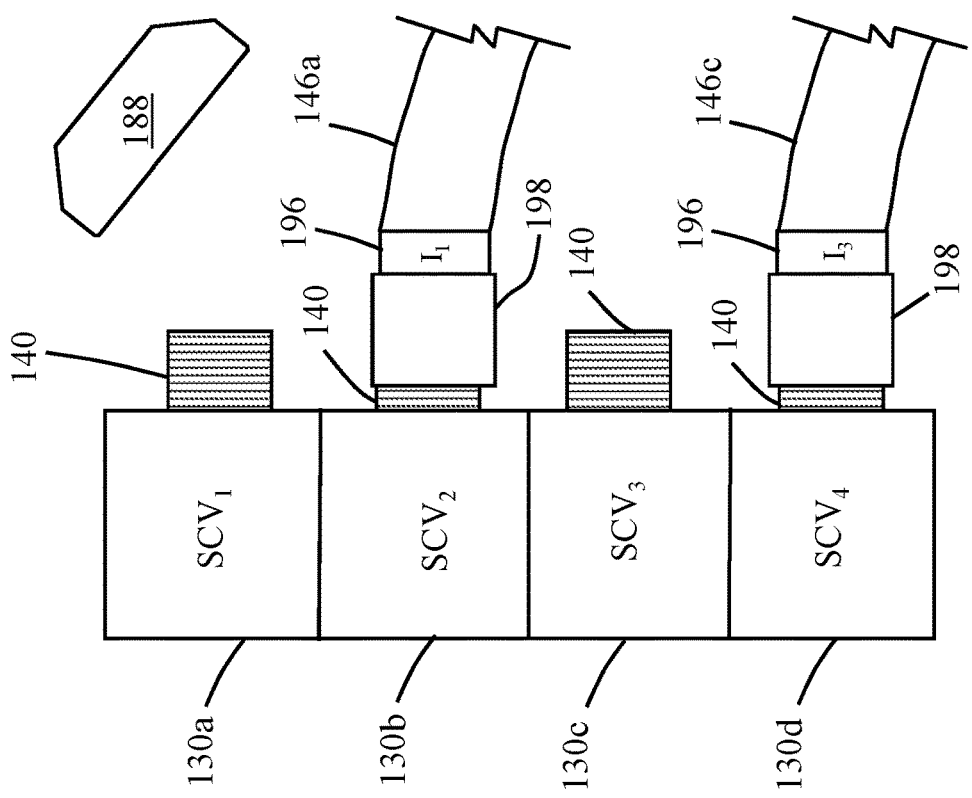

FIG. 4 provides an example in which a first conduit 146*a* is identified by a first identifier ($I_1$), and a third identifier is identified by a third identifier ($I_3$). As previously discussed, each identifier ($I_1$, $I_2$, $I_3$, $I_4$) can, with respect to the implement 104, provide an indication of the particular subsystem 150*a-d* to which the conduit 146*a-d* associated with that identifier ($I_1$, $I_2$, $I_3$, $I_4$) is fluidly coupled. Such assignments of the identifiers ($I_1$, $I_2$, $I_3$, $I_4$) can be preset, including be part of a default setting, or be a setting that can be adjusted by an operator. Further, such identification of the identifier ($I_1$, $I_2$, $I_3$, $I_4$), and thus the associated conduit 146*a-d*, being associated with a particular subsystem 150*a-d* can be recorded or otherwise stored, including, but not limited to, by a memory device or database, including, for example, the memory device 194 of the sensor system controller 190, or the secondary device 168, among other memory devices or databases.

In the example shown in FIG. 4, a sensor 187, such as, for example, an optical sensor 188, can capture information in one or more images or videos obtained by the sensor 187. The captured information in this example, can provide information that the sensor system controller 190 can analyze to identify the first identifier ($I_1$). For example, as previously discussed, according to certain embodiments in which the identifiers ($I_1$, $I_2$, $I_3$, $I_4$) each have a different color, the sensor system controller 190 can identify, from the captured information provided by the sensor 187, the color of the first identifier ($I_1$).

The sensor system controller 190 can also retrieve or access information indicating the subsystem 150*a-d*, or associated operation 180*a-d*, of the implement 104 that is associated with the first identifier ($I_1$), and, moreover, the subsystem 150*a-d* to which the conduit 146*a* having the first identifier ($I_1$) is, or is to be, fluidly coupled. The sensor system controller 190 can also analyze the captured information with respect to performing object detection, wherein the sensor system controller 190 can analyze the captured information to determine which particular SCV 130*a-d* the conduit 146 of the identified identifier ($I_1$) is attached. As previously mentioned, according to certain embodiments, such object detection can utilize known depth information, among other information, regarding the location, relative positions or spacing of the SCVs 130*a-d* to identify each particular SCV 130*a-d* in the captured information.

Thus, in the example illustrated in FIG. 4, using at least the captured information, the sensor system controller 190 can identify that the conduit 140*a* associated with the first identifier ($I_1$) is coupled to the second SCV 130*b*. With information regarding the particular subsystem 150*a* associated with the first identifier ($I_1$), the sensor system controller 190 can identify that the second SCV 130*b* is being used in connection with the operation 180*a* of the first subsystem 150*a*. For example, the first identifier ($I_1$) can be associated with a subsystem 150*b* that controls the raising, or opening, and lowering, or closing, of the gate 126 of an implement 104 in the form of a baler. Thus, in this example, by identifying the that conduit 146*a* associated with the first identifier ($I_1$) is coupled to the second SCV 130*b*, the sensor system controller 190 can automatically identify for the operator that the second SCV 130*b* is to be operated to control the raising and lowering of the gate 126.

Similarly, in the example shown in FIG. 4, the captured information provided from the sensor 187 can also be used by at least the sensor system controller 190 to identify the third identifier ($I_3$) in connection with recognizing the associated third conduit 146*c* is coupled to the fourth SCV 130*d*. Thus, in this example, the sensor system controller 190 can retrieve or receive information indicating that the operation of the particular subsystem 150*c* of the implement 104 that is coupled to the third conduit 146*c* can, at least partially, be controller via operation of the fourth SCV 130*d*. For example, the third subsystem 150*c* can relate to one or more hydraulically actuated actuators that can be utilized to adjust a position or height of the pick-up mechanism 118 relative to the ground surface 110 or a windrow. Thus, information obtained by the sensor system 186 can be used to generate information to an operator of the agricultural machine 100 that the operation of the third SCV 130*c* can be used to control or adjust the position of the pickup mechanism 118.

Such automatic recognition, and assignment, of the particular SCV 130a-d at the agricultural vehicle 102 that is fluidly coupled to a particular subsystem 150a-d, or associated operation 180a-d, of the implement 104 can eliminate the need for an operator to manually determine, remember, and correctly input any identification of assignments of each of the different SCVs 130a-d to each of the different subsystems 150a-d or operations 180a-d of the implement 104. Further, such automatic detection and assigned of the particular SCV 130a-d from the plurality of SCVs 130a-d that is to be assigned to each subsystem 150a-d or operations 180a-d can further improve the safety of the operation of the work machine 100 and implement 104. Moreover, inadvertent assignment of the wrong SCV 130a-d to a subsystem can have significant consequences. For instance, in the above-discussed example shown in FIG. 4, the first subsystem 150a of the implement 104 is fluidly coupled, and at least partially controlled by, the operation of the second SCV 130b, and is discussed above as being related to functions involving the raising and lowering of the gate 126. However, an operator may mistakenly assign the second SCV 130b as being coupled to, or used to operate, the third subsystem 150c, which in this example is instead configured to adjust the height of the pick-up mechanism 118. In such a situation, in the event the operator seeks to adjust the height pick-up mechanism 118 via operation of at least the second SCV 130b, the operator would instead inadvertently cause the gate 126 to either be raised or lowered, which can create a hazardous situation, particularly if an individual is positioned by or behind the gate 126. However, the automatic detection of which subsystem 150a-d or associated operation 180a-d is fluidly coupled to a particular SCV 130a-d, and the automatic assignment of such subsystems 150a-d and their associated operation 180a-d via use of the identified SCV 130a-d can advert such potentially hazardous situations, as well as further reduce the burden on the operator to correctly remember and make such assignments.

Figure 5:
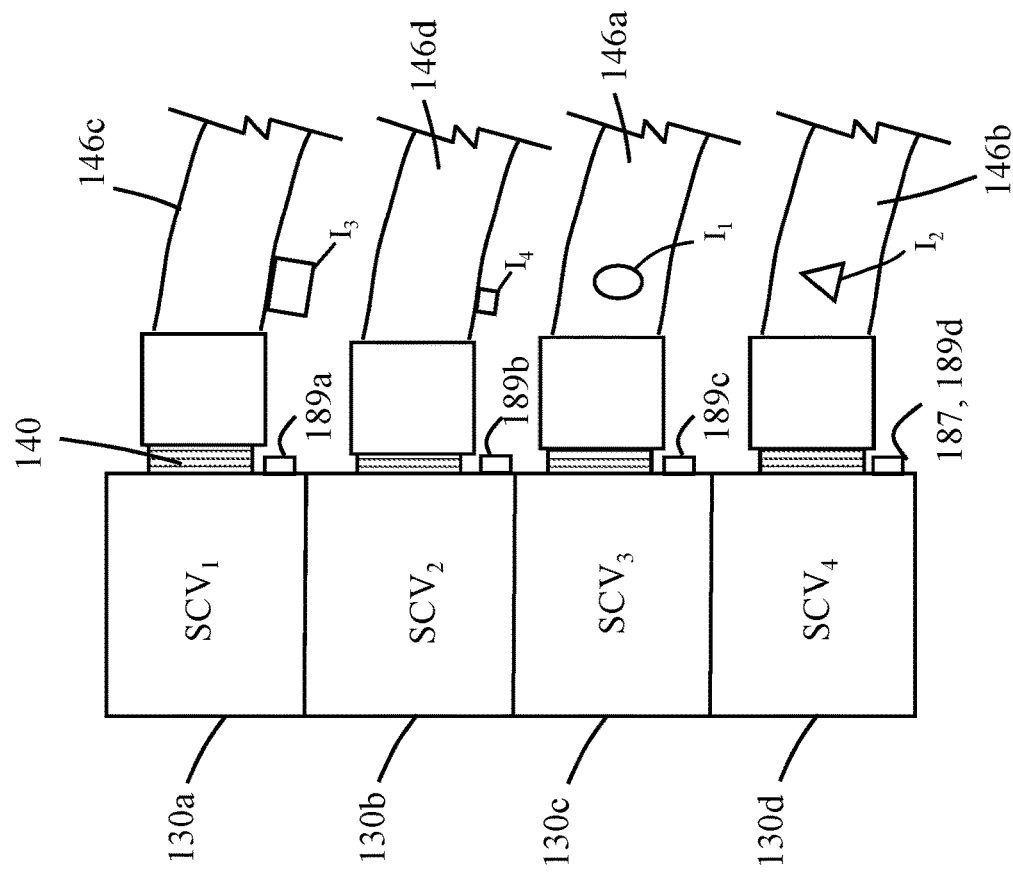
FIGS. 4 and 5 illustrate side views of embodiments of the selective control valve connector manifold without protective covers and in which at least some of the SCVs are coupled to conduits that may each be fluidly coupled to one or more subsystems of the agricultural implement.

FIG. 5 illustrates another example of one or more sensors 187 of the sensor system 186 being used to provide information to identify an identifier ($I_1$, $I_2$, $I_3$, $I_4$) provided on, or otherwise coupled to, a conduit 146, as well to identify the particular SCV 130a-d to which the conduit 146a-d associated with the identifier ($I_1$, $I_2$, $I_3$, $I_4$) is coupled. Moreover, FIG. 5 provides an example of a sensor 187 being a plurality of proximity sensors 189a-d, such as, for example, an inductive proximity sensors. Thus, unlike the example shown in FIG. 4 in which the sensor 187 can be coupled to the implement 104, in the example shown in FIG. 5, the inductive proximity sensors 189a-d can be coupled to the agricultural vehicle 102, and more specifically, to one or more of the SCVs 130a-d. According to such an example, the identifiers ($I_1$, $I_2$, $I_3$, $I_4$) can be an electrically conductive material, including, for example, a magnetic material, that can generate eddy currents that can impact a magnetic field generated by the inductive proximity sensors 189a-d. Additionally, each identifier ($I_1$, $I_2$, $I_3$, $I_4$) can have a different configuration, including, for example, shape, size, or thickness, as well as combinations thereof, among other differences, that can differently influence the extent each identifier ($I_1$, $I_2$, $I_3$, $I_4$) has on magnetic losses that are attributed to eddy currents. The sensor system controller 190 can include, or retrieve, information, that can identify anticipated ranges of detected magnetic losses anticipated to be associated with each of the different identifiers ($I_1$, $I_2$, $I_3$, $I_4$). Such differences in the extent of anticipated magnetic losses can assist the sensor system controller 190 with identifying the particular identifier ($I_1$, $I_2$, $I_3$, $I_4$) that is positioned by an inductive proximity sensor 189a-d of a particular SCV 130a-d.

For example, FIG. 5 illustrates an example in which a first identifier ($I_1$) has a generally oval cross-sectional shape, a second identifier ($I_2$) has a triangular cross-sectional shape, and third and fourth identifiers ($I_3$, $I_4$) have generally square or rectangular cross-sectional shapes, wherein the third identifier ($I_3$) has a size, such as, for example, a thickness and width, that is greater than the corresponding sizes of the fourth identifier ($I_4$). In such an example, the anticipated magnetic losses, or ranges thereof, due to eddy currents for each of the identifiers ($I_1$, $I_2$, $I_3$, $I_4$) can be predetermined or anticipated and stored, or otherwise retrievable by the sensor system controller 190, and can be used to distinguish information detected by the inductive proximity sensors 189a-d. Thus, in such an example, information or readings of the magnetic losses detected by an inductive proximity sensor 189c of the third SCV 130 can be communicated to the sensor system controller 190. The sensor system controller 190 can then compare such information with anticipated or predetermined magnetic loss information to identify the corresponding identifier, which in this example, is the first identifier ($I_1$). Based on such information, as well as stored or recorded information regarding the subsystem 150a-d or operation 180a-d of the implement 104 associated with the first identifier ($I_1$), the SCV detection system 200, including, for example, the sensor system controller 190, can identify the particular subsystem 150a-d or operation 180a-d to which the third SCV 130c is fluidly coupled. A similar process can also be utilized for one or more of the other SCVs 130a, 130b, 130d to also automatically identify and assigned a particular subsystem 150a-d, or associated operation 180a-d, of the implement 104 to each SCV 130a-d.

While FIGS. 4 and 5 provide examples of sensors 187 that can be utilized by the SCV detection system 200, and which can be located at either, or both, the agricultural vehicle 102 or the implement 104, a variety of other sensors can also be utilized. For example, according to other embodiments the sensor 187 can include one or more emitters or readers 191 and one or more receivers or tags 193, including, but not limited to, readers 191 and tags 193 that can be utilized with passive radio-frequency identification systems, among other types of sensors. According to such an embodiment, the tags 193 can be located on one or more of the conduits 146, and the receivers 193 can be positioned at or around the SCVs 130a-d. Additionally, the foregoing examples discuss the identifiers ($I_1$, $I_2$, $I_3$, $I_4$) being predesignated or assigned to a particular subsystem 150a-d or operation 180a-d. However, similar to the above-discussed embodiments in which identifiers ($I_1$, $I_2$, $I_3$, $I_4$) are used in connection with the automatic detection and assignment of a particular SCV 130a-d to a subsystem 150a-d, a similar approach can be utilized to determine the specific subsystem 150a-d to which a particular identifier ($I_1$, $I_2$, $I_3$, $I_4$), or associated conduit 146a-d, is to be assigned. For example, the sensor system 186 can also be configured to detect the particular identifier ($I_1$, $I_2$, $I_3$, $I_4$) for the conduit 146a-d that is coupled to a connector(s) of a particular subsystem(s) 150a-d. Using such information, the sensor system controller 190, among other components of the SCV detection system 200, can automatically assign, and record, a particular identifier ($I_1$, $I_2$, $I_3$, $I_4$) being associated with either or both a specific subsystem 150a-d or operation 180a-d. Thus, when that particular identifier ($I_1$, $I_2$, $I_3$, $I_4$), or a related identifier, is also identified as being coupled to a particular SCV 130a-d, the sensor system controller 190, among other portions of the SCV detection system 200, can automatically assign that SCV 130a-d to the identified subsystem 150a-d or operation 180a-d, and vice versa.

Figure 6:
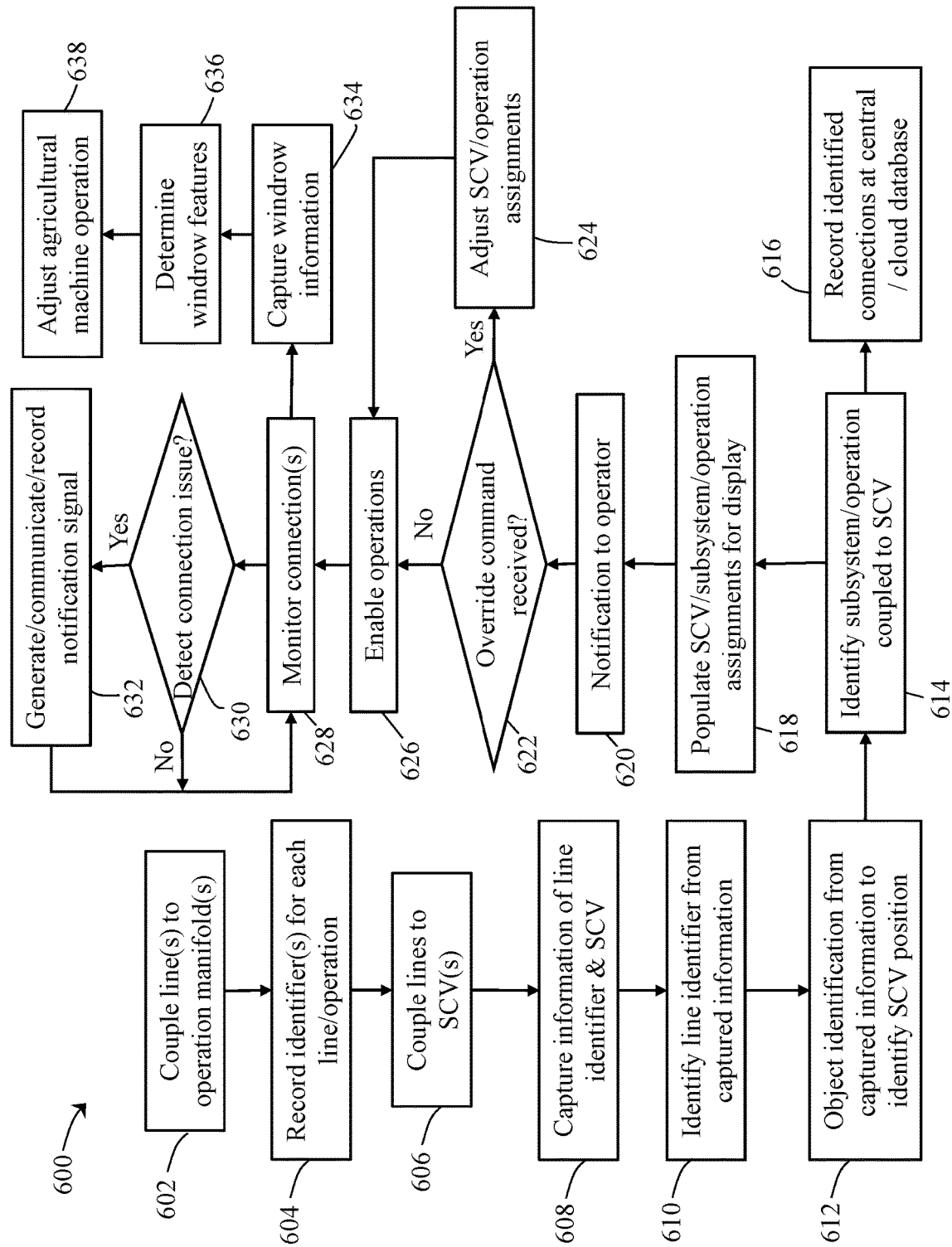
FIG. 6 illustrates an exemplary method for controlling operation of an SCV detection system.

FIG. 6 illustrates an exemplary method 600 for identifying an SCV 130a-d that is fluidly coupled to a subsystem 150a-d of an implement 104, as well as assigning the identified SCV 130a-d for selective control of an operation 180a-d of the subsystem 150a-d. The method 600 is described below in the context of being carried out by the illustrated exemplary SCV detection system 200. However, it should be appreciated that method 600 can likewise be carried out by any of the other described implementations, as well as variations thereof. Further, the method 600 corresponds to, or is otherwise associated with, performance of the blocks described below in the illustrative sequence of FIG. 6. It should be appreciated, however, that the method 600 can be performed in one or more sequences different from the illustrative sequence. Additionally, one or more of the blocks mentioned below may not be performed, and the method 600 can include steps or processes other than those discussed below.

At block 602, to the extent not already connected, a conduit 146 can be fluidly coupled to a subsystem 150a-d of the implement 104. For example, referencing FIG. 3, a connector body 198 of a supply line of the conduit 146 can be coupled to a fluid inlet 154 of a subsystem 154a-d, and a connector body 198 of an outlet line of the conduit 146 can be coupled to a fluid outlet 152 of that subsystem 150a-d. In such an arrangement, at least one of the supply line and the outlet line of the conduit 146 can include an identifier ($I_1$, $I_2$, $I_3$, $I_4$) that can be used in connection with the identification of the SCV 130a-d to which the conduit 146 is coupled, as well as an assignment of that SCV 130a-d to a subsystem 150a-d or the associated operation 180a-d of the subsystem 150a-d, as previously discussed. Thus, at block 604, to the extent not already recorded, the identifier ($I_1$, $I_2$, $I_3$, $I_4$) to be utilized in detecting a fluid connection with either or both a particular subsystem 150a-d or corresponding operation 180a-d can be recorded. Additionally, or alternatively, the subsystem 150a-d to which the conduit 146 is connected, or the associated identifier ($I_1$, $I_2$, $I_3$, $I_4$) to be identified as being associated with a connection to that subsystem 150a-d or operation 180a-d, can be automatically detected and recorded in a manner similar to the manners discussed above in which the particular SCV 130a-d connected to the conduit 146, or the identifier ($I_1$, $I_2$, $I_3$, $I_4$) associated with that connection to the SCV 130a-d, is detected. At block 606, the conduit 146 can also be fluidly coupled to an SCV 130a-d at the agricultural vehicle 102. For example, as previously discussed, a connector body 198 of the supply line of the conduit 146 can be coupled to a coupling 140 for a fluid outlet 134 of the SCV 130a, and a connector body 198 of the return line of the conduit 146 can be coupled to a coupling 140 of a fluid inlet 136 of the SCV 130a-d.

At block 608, the sensor system 186 can be utilized to capture information that the sensor system controller 190 can utilize at block 610 to identify the particular identifier ($I_1$, $I_2$, $I_3$, $I_4$) associated with the conduit 146 that was attached at block 606. For example, as previously discussed, the sensor system controller 190 can evaluate the captured information on a pixel level so as to obtain information that can be used to identified the particular identifier ($I_1$, $I_2$, $I_3$, $I_4$) associated with the conduit 146 that has been connected to the SCV 130a-d. For example, as previously discussed, the sensor system controller 190 can utilize captured information to identify a color associated with the identifier ($I_1$, $I_2$, $I_3$, $I_4$), among other information, including, but not limited to, a size or shape of the identifier ($I_1$, $I_2$, $I_3$, $I_4$) or other alphanumeric, numeric, or graphic information, among other indicators, provided by the identifier ($I_1$, $I_2$, $I_3$, $I_4$).

At block 612, the sensor system controller 190 can also utilize the captured information in connection with objection detection capabilities of the sensor system controller 190. Moreover, the sensor system controller 190 can utilize the captured information to determine the particular SCV 130a-d to which the conduit 146a-d associated with the identified identifier ($I_1$, $I_2$, $I_3$, $I_4$) is coupled. Again, such object detection can be performed in a variety of different manners, including, for example, based on a distance of the SCV 130a-d from the sensor 187, or spatial relationship among the various SCVs 130a-d, among other manners of object detection.

The identification from block 612 of the particular SCV 130a-d to which the conduit 146 associated with the identified identifier ($I_1$, $I_2$, $I_3$, $I_4$) is coupled, and information from block 604 indicating the particular subsystem 150a-d or operation 180a-d associated with that identifier ($I_1$, $I_2$, $I_3$, $I_4$), at block 614 the identified SCV 130a-d can be identified or assigned as being used in the control of either or both the identified subsystem 150a-d or the associated operation 180a-d.

While blocks 602 through 614 are discussed above with respect to identification of one identifier ($I_1$, $I_2$, $I_3$, $I_4$), an associated SCV 130a-d, and a particular subsystem 150a-d or operation 180a-d, the method at blocks 602 through 614 can be performed, or repeated, for a plurality of identifiers ($I_1$, $I_2$, $I_3$, $I_4$), conduits 146a-d, SCVs 130a-d and subsystems 150a-d or operations 180a-d. For example, referencing the exemplary embodiment shown in FIG. 3, blocks 602 through 614 can be performed with respect to identifying the particular subsystems 150a-d or operations 180a-d that are to be operated for each of four different SCVs 130a-d. According to certain embodiments, the information captured by the sensor 187, such as, for example, the same image, collection of images, or video, can be utilized to identify, for a plurality, if not all, of the SCVs 130a-d, the corresponding subsystem 150a-d or operation 180a-d that is fluidly coupled to that SCV 130a-d. Alternatively, or additionally, additional or different captured information, including, for example, different images, video, or proximity information can be used for one or more of the SCVs 130a-d to determine the particular subsystem 150a-d or operation 180a-d to which that SCV 130a-d is fluidly coupled.

At block 618, an identification for an operator of the particular subsystem 150a-d or operation 180a-d to which each SCV 130a-d is fluidly coupled can be created or populated. For instance, as previously mentioned FIG. 3 illustrates an example in which a first SCV 130a is fluidly coupled to a second subsystem 150b of the implement 104, a second SCV 130b is fluidly coupled to a first subsystem 150a of the implement 104, a third SCV 130c is fluidly coupled to a fourth subsystem 150d of the implement 104, and a fourth SCV 130d is fluidly coupled to third subsystem 150c of the implement 104. An identification of such connections of the SCVs 130a-d to the subsystems 150a-d can be populated at block 618. Additionally, as illustrated by FIG. 7, such a population identifying which SCVs 130a-d are connected to which particular subsystems 150a-d or operations 180a-d can be displayed on a graphical user interface (GUI) 202 that is shown in a display on a display unit 184 control panel in the operator cab 128. For example, each subsystem 150a-d, or the associated operation 180a-d, and the SCV 130a-d that has been identified as being connected to, or otherwise assigned, to that subsystem 150*a-d* or operation 180*a-d*, can be shown in a separate icon 165*a-d* on the GUI 202. While, for at least purposes of illustration, the icons 165*a-d* shown in FIG. 7 user the terms "Subsystem" and "Operation", the subsystem 150*a-d* or operation 180*a-d* can be represented in each of the different icons 165*a-d* in different manners, including, for example, with textual descriptions, graphics, or images, as well as combinations thereof. Thus, for example, if "Subsystem 150*a-d*₁/Operation₁" is associated with raising or lowering the gate, the associated icon 165*a-d* can include a graphical image representing the movement of a gate. Further, as seen in FIG. 7, the particular SCV 130*a-d* associated with that subsystem 150*a-d* or operation 180*a-d*, as identified, for example, at block 614, can also be shown in the icons 165*a-d* on the GUI 202.

At block 620, the operator of the agricultural machine 100 can be notified that the SCV 130*a-d* and subsystem 150*a-d* or operation 180*a-d* assignments have been populated, including, for example, via visual or audible notification from the user interface 164. The operator can then decide at block 622 whether to accept, or override, the SCV 130*a-d* assignments identified by the SCV detection system 200 at block 614. For instance, the first icon 165*a* shown in FIG. 7 indicates that the SCV detection system 200 has identified the first subsystem 150*a-d* or operation 180*a-d* as being coupled, or assigned, to the second SCV 130*b*, and that the SCV detection system 200 has also identified the second subsystem 150*a-d* or operation 180*a-d* as being coupled, or assigned, to the first SCV 130*a*. At block 620 however, the operator can be given an opportunity to issue a command, such as, for example, via the use of the user interface 164 to select an icon 165*f* on the GUI 202, indicating the operator's intention to override one or more of the identified SCV 130*a-d* assignments. Moreover, the operator can be given an opportunity to communicate to the controller 158, among other controllers 158, 190, that the operator is overriding at least some of the identified assignments, as well as proceed with changing the assignments.

For example, if at block 620 the operator decides to override at least some, if not all, of the assignments of which particular SCV 130*a-d* is being used with a particular subsystem 150*a-d* or operation 180*a-d*, then at block 624, the operator can make such adjustments. For example, referencing FIG. 7, the operator can utilize the user interface 164 to indicate that the operator is going to override, or adjust, at least some of the SCV 130*a-d* assignments made by the SCV detection system 200. Therefore, continuing with the example shown in FIG. 7, the operator could, via generating a signal(s) through use of the user interface 164, adjust the SCV 130*a-d* assignments such that the first subsystem 150*a-d* or operation 180*a-d* is to be operated using the first SCV 130*a*, and instead of the second, SCV 130*b*, and the second subsystem 150*a-d* or operation 180*a-d* is to be operated using the second SCV 130*b*, and instead of the first SCV 130*a*. Such commands from the user interface 164 can then, in this example, be received by the controller 158, 170, 190 to change which particular SCV 130*a*, 130*b* is operating the first and second subsystem 150*a*, 159*b* or the associated operations 180*a*, 180*b*, respectively.

Conversely, if at block 622 and operator decides not to issue a command to override the assignments that were made at least at block 614, or has accepted previously made adjustments in those assignments, then at block 626 the operator can enable use of the SCVs 130*a-d* with the assigned subsystems 150*a-d* or operations 180*a-d*, such as, for example, using the user interface 164 to select an enablement or acknowledgement icon 165*e* on the GUI 202.

With operations of the SCVs 130*a-d* enabled, the operator can select a particular icon(s) 164*a-d* shown on the display unit 184, such as, for example, via use of the user interface 164, to cause the associated operation 180*a-d* of the SCV 130*a-d* assigned to that particular subsystem 150*a-d*/operation 180*a-d*. Thus, the operator can select a particular icon 165*a-d* with respect to allowing, maintaining, or stopping a flow of hydraulic fluid through the corresponding SCV 130*a-d*. As previously discussed, such control of fluid flow through each particular SCV 130*a-d* can be used to control the associated operation of at least hydraulic actuators of the corresponding assigned subsystem 150*a-d*, and thereby control the operation 180*a-d* of the subsystem 150*a-d*.

Additionally, according to certain embodiments, the sensor system 186 can also be utilized to monitor at least certain aspects of the fluid circuits 138*a-d* associated with each SCV 130*a-d*. For example, according to certain embodiments, information captured by the sensor system 186 can be analyzed by the sensor system controller 190, among other controllers 158, 170, to determine whether hydraulic fluid is, or is not, leaking from any connections between the conduits 146 and the associated SCVs 130*a-d*. For example, captured information from the sensors 187 can be utilized to detect whether hydraulic fluid is leaking from a connection between a coupling of the SCV 130*a-d* and the connector body 198 of the associated conduit 146, or whether the integrity of the SCV 130*a-d* or conduit 146 has been compromised in a manner that may be resulting in a leakage of hydraulic fluid from the associated fluid circuit 138*a-d*.

Accordingly, at block 628 the sensor system controller 190, among other controllers 158, 170, can examine information captured by the sensor 187 in connection with determining whether the captured information provides an indication of a leakage of hydraulic fluid, among other potential problems involving the operation 180*a-d* of the SCVs 130*a-d*, conduits 146, and associated fluid circuits 138*a-d*. If the sensor system controller 190, among other controllers 158, 170, determines at block 630 that the captured information does indicate at least the potential presence of a leakage of hydraulic fluid, among other problems, then at block 632 the sensor system controller 190, or other controllers 158, 170, can generate a signal to provide a notification of the leakage or other problem(s) to the user interface 164 or GUI 202. Such a notification, or alarm, can be communicated to the operator in a variety of different manners, including, for example, via a visual warning message or icon 165*g* or an audible alert communicated to the operator that can be communicated to the operator via the display unit 184 or other portion of the user interface 164.

The sensor system 186 can also be utilized to obtain information regarding a variety of other operations relating to the agricultural machine 100. For example, with respect to embodiments in which the implement 104 is a baler, at block 634, the sensor system 186 can capture information, such as, for example, from one or more images or videos obtained via use of the optical sensor 188, that can provide information regarding a windrow. Moreover, the optical sensor 188 can be positioned, or, alternatively, can be selectively adjustable, with respect to at least the area(s) from which the sensor 187 captures information so as to capture information relating to at least portions of the window that the baler is, or will be, collecting cut crop material. In such an example, using the captured information that was obtained at block 634, the sensor system controller 190, among other controllers 158, 170, can, at block 636, analyze the captured information to derive information regarding features or characteristics of the windrow. Such information derived at block 636 can include, for example, information regarding a position, orientation, width, vertical height, or density, as well as combinations thereof, among other information, regarding the windrow. The information derived at block 636 can then be used by a controller 158 to adjust an operation 180*a-d* of the agricultural machine including, for example, an operation 180*a-d* of the associated agricultural vehicle 102 or implement 104. For example, information regarding the vertical height or density of the windrow can be utilized to adjust a height of the pick-up mechanism 118 of the implement 104, the direction at which a steering system guides the movement of the agricultural vehicle 102, a speed at which the agricultural vehicle 102 travels, or a position of the agricultural machine 100, as well as combinations thereof, among other adjustments in the operation of the agricultural machine 100.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A method for identifying a fluid connection between a control valve secured to an agricultural vehicle and an implement of an agricultural machine, the method comprising:
   transmitting a signal containing captured information obtained by a sensor;
   identifying, from the transmitted captured information, an identifier coupled to a conduit;
   retrieving or receiving an identification of at least one of a subsystem or an operation of the implement assigned to the identifier;
   detecting, from the captured information, the control valve to which the conduit is fluidly coupled;
   recording an assignment of the control valve detected from the captured information to at least one of the subsystem or the operation assigned to the identifier; and
   transmitting a signal for displaying, on a display unit, an identification of the assignment of the control valve identified from the captured information to at least one of the subsystem or the operation.

2. The method of claim 1, wherein the sensor is an optical sensor, and wherein the captured information comprises one or more images or videos.

3. The method of claim 2, wherein the detecting the control valve comprises detecting the control valve via object detection using the captured information.

4. The method of claim 1, further comprising displaying, on the display unit, the assignment of the control valve to at least one of the subsystem or the operation.

5. The method of claim 4, further comprising receiving an override command that changes the assignment of the control valve to at least one of another subsystem or another operation of the implement.

6. The method of claim 1, further comprising:
   capturing additional captured information by the sensor;
   detecting, from the additional captured information, a presence of a leak of a hydraulic fluid; and
   transmitting a signal providing an indication of the detection of the presence of the leak.

7. The method of claim 6, further comprising:
   adjusting at least one of a speed of travel, a direction of travel, or a location of at least one of the agricultural vehicle or the implement based, at least in part, from information derived from the additional captured information.

8. The method of claim 1, further comprising:
   capturing additional captured information by the sensor;
   adjusting at least one of a speed of travel, a direction of travel, or a location of at least one of the agricultural vehicle or the implement based, at least in part, from information derived from the additional captured information.

9. The method of claim 1, wherein the sensor comprises a plurality of proximity sensors, and wherein the control valve is one of a plurality of control valves, each proximity sensor of the plurality of proximity sensors being coupled to a different control valve of the plurality of control valves, and wherein, for each control valve of the plurality of control valves, the method further comprises:
   detecting, by the proximity sensor, a magnetic field loss; and
   identifying the identifier of the conduit coupled to the control valve using at least the detected magnetic field loss.

10. A method for identifying fluid connections between a plurality of control valves secured to an agricultural vehicle and a plurality of subsystems or operations of an implement, the method comprising:
    identifying, from information captured by one or more sensors, a plurality of identifiers, each identifier of the plurality of identifiers being coupled to a different conduit of a plurality of conduits, each conduit being coupled to a control valve of the plurality of control valves and at least one of a subsystem of a plurality of subsystems or an operation of a plurality of operations of the implement;
    retrieving or receiving, for each identifier of the plurality of identifiers, an identification of at least one of the subsystem or the operation assigned to the identifier, at least some of the plurality of identifiers assigned to a different subsystem of the plurality of subsystems or a different operation of the plurality of operations, than at least another identifier of the plurality of identifiers;
    identifying, for each identifier, and from the captured information, the control valve of the plurality of control valves that is to be associated with at least one of the identifier or the conduit that is coupled to the identifier;
    recording an assignment of the control valve identified from the captured information to at least one of the subsystem or the operation assigned to the identifier; and
    transmitting one or more signals for displaying on a display unit an identification, for each control valve, of the assignment of the control valve to at least one of the subsystem or the operation.

11. The method of claim 10, further comprising:
    capturing additional captured information by the one or more sensors;
    detecting, from the additional captured information, a presence of a leak of a hydraulic fluid; and
    transmitting a signal providing an indication of the detection of the presence of the leak.

12. The method of claim 11, further comprising:
    adjusting at least one of a speed of travel, a direction of travel, or a location of at least one of the agricultural vehicle or the implement based, at least in part, from information derived from the additional captured information.

13. The method of claim 11, further including recording the detection of the presence of the leak at a secondary device that is remote from the agricultural vehicle and the implement.

14. The method of claim 10, further comprising:
capturing additional captured information by the one or more sensors;
adjusting at least one of a speed of travel, a direction of travel, or a location of at least one of the agricultural vehicle or the implement based, at least in part, from information derived from the additional captured information.

15. A system for identifying a fluid connection between a control valve secured to an agricultural vehicle and an implement, the system comprising:
a plurality of identifiers, each identifier of the plurality of identifiers being coupled to a conduit of a plurality of conduits, each conduit of the plurality of conduits configured to be fluidly coupled between a control valve of a plurality of control valves at the agricultural vehicle and a subsystem of a plurality of subsystems of the implement;
at least one sensor positioned to capture information;
a display unit;
at least one processor; and
a memory device coupled with the at least one processor, the memory device including instructions that when executed by the at least one processor cause the at least one processor to:
identify, from information captured by the at least one sensor, at least one identifier of the plurality of identifiers;
retrieve or receive, for the at least one identifier, an identification of at least one of the subsystem or an operation of the subsystem assigned to the at least one identifier;
identify, for each of the at least one identifier, and from the captured information, the control valve of the plurality of control valves that is to be associated with the at least one identifier or the conduit that is coupled to the at least one identifier;
determine an assignment of the control valve identified from the captured information to the at least one of the subsystem or the operation of the subsystem assigned to the at least one identifier; and
generate one or more signals to display on the display unit an identification of the assignment of the control valve to at least one of the subsystem or the operation of the subsystem.

16. The system of claim 15, wherein the at least one sensor comprises an optical sensor.

17. The system of claim 15, wherein the at least one sensor comprises an inductive proximity sensor.

18. The system of claim 15, wherein the memory device includes instructions that when executed by the at least one processor further cause the at least one processor to:
detect, from information captured by the at least one sensor, a leak of a hydraulic fluid being circulated between the agricultural vehicle and the implement.

19. The system of claim 15, wherein the memory device includes instructions that when executed by the at least one processor further cause the at least one processor to:
adjust at least one of a speed of travel, a direction of travel, or a location of at least one of the agricultural vehicle or the implement based, at least in part, on information captured by the at least one sensor.

20. The system of claim 15, wherein the memory device includes instructions that when executed by the at least one processor further cause the at least one processor to:
transmit information captured by the at least one sensor to a secondary device that is remote from the agricultural vehicle and the implement.

* * * * *